(12) United States Patent
Gudlavenkatasiva et al.

(10) Patent No.: US 8,666,360 B2
(45) Date of Patent: Mar. 4, 2014

(54) CONTACT COMMUNICATION TRACKING SYSTEM

(75) Inventors: Bhaskar R. Gudlavenkatasiva, Tampa, FL (US); Nityanand Sharma, Tampa, FL (US); George L. Hughes, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 279 days.

(21) Appl. No.: 13/302,257

(22) Filed: Nov. 22, 2011

(65) Prior Publication Data

US 2013/0130641 A1    May 23, 2013

(51) Int. Cl.
| | |
|---|---|
| H04M 11/04 | (2006.01) |
| H04B 17/00 | (2006.01) |
| H04B 1/16 | (2006.01) |
| H04L 12/58 | (2006.01) |
| H04W 24/00 | (2009.01) |
| H04B 15/00 | (2006.01) |
| H04W 36/00 | (2009.01) |
| G01R 31/08 | (2006.01) |
| H04J 3/00 | (2006.01) |
| H04L 12/28 | (2006.01) |
| G06F 15/173 | (2006.01) |

(52) U.S. Cl.
USPC .......... 455/404.1; 455/67.11; 455/161.3; 455/412.1; 455/423; 455/436; 455/501; 370/241; 370/251; 370/337; 370/395.41; 709/224; 709/228; 379/45

(58) Field of Classification Search
USPC ........ 455/67.11, 161.3, 412.1, 423, 436, 501, 455/404.01; 370/241, 251, 337, 395.41; 709/224, 228; 379/45
See application file for complete search history.

(56) References Cited

U.S. PATENT DOCUMENTS

2008/0139167 A1*   6/2008   Burgess .............. 455/404.1

* cited by examiner

*Primary Examiner* — Inder Mehra

(57) ABSTRACT

Methods, devices, and storage media for tracking communications between a user and a user-selected party; obtaining communication tracking information based on the tracking, wherein the communication tracking information includes a time associated with each communication; calculating a communication gap pertaining to the user-selected party based on the communication tracking information, wherein the communication gap is a period of time that elapsed from a last communication with the other party to a current time; and providing the user with communication gap information in response to receiving a user request.

25 Claims, 10 Drawing Sheets

CONTACT COMMUNICATION TRACKING SYSTEM

BACKGROUND

With the development of user devices, users may access and exchange information anywhere and anytime. Typically, these user devices offer users a variety of services and applications. For example, these user devices may provide telephone service, e-mail service, texting service (e.g., Instant Messaging (IM) service, Short Messaging Service (SMS), Multimedia Messaging Service (MMS)), and video communication services.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, a communication tracking system portal tracks communication gaps between a user and his/her designated entities. For example, these designated entities may be implemented as contacts in a contacts book, an address book, a phone book, or the like; a business entity associated with a bill, etc. According to an exemplary embodiment, the communication tracking system portal provides the user with a notification (e.g., an alert, a reminder, a message, etc.) to inform the user of a communication gap (e.g., a time period lapse of communication relative to a contact). The user may be motivated to initiate a communication with the contact based on the notification. As a result, among other things, social gaps between the user and friends, family members, business contacts, etc., may be minimized.

According to an exemplary embodiment, the communication tracking system portal tracks communications received by or transmitted from a user device associated with the user. For example, the communications may include telephone calls (e.g., wireless, Voice-over-Internet Protocol (VoIP)), e-mails, IMs, SMS messages, MMS messages, video calls, and/or social network communications (e.g., posts, tweets, etc.). According to an exemplary embodiment, the communication tracking system portal links identified communication gaps with current usage limits. For example, the communication tracking system portal may identify that the user has 100 remaining telephone minutes to use in the next two days. Based on this information, the communication tracking system portal generates contact recommendations to the user. According to other embodiments, the communication tracking system portal generates recommendations based on other information. For example, according to an exemplary implementation, the communication tracking system portal uses calculated affinities levels to generate a contact recommendation.

According to an exemplary embodiment, the communication tracking system portal provides the user with various user interfaces to manage and control communication tracking services. According to an exemplary implementation, the communication tracking system portal is implemented as a Web-based system. According to another exemplary implementation, the communication tracking system portal is implemented by a user device. According to yet another implementation, the communication tracking system portal is collaboratively implemented by one or more network devices and a user device.

Figure 1:
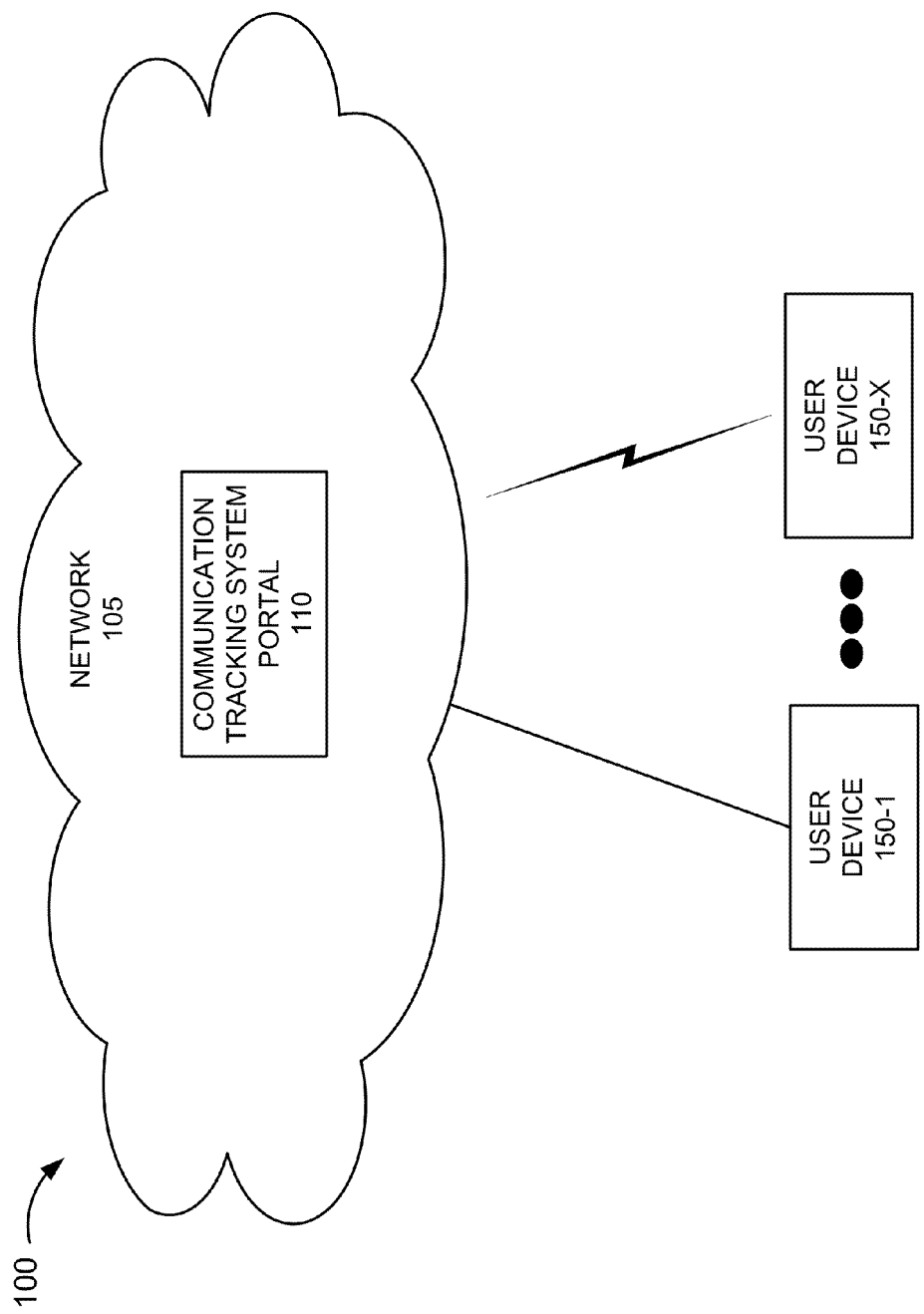
FIG. 1 is a diagram illustrating an exemplary environment in which an exemplary embodiment of a communication tracking system portal may be implemented.

FIG. 1 is a diagram illustrating an exemplary environment in which an exemplary embodiment of a communication tracking system portal may be implemented. As illustrated, environment 100 includes a network 105 that includes a communication tracking system portal 110. Additionally, environment 100 includes user devices 150-1 to 150-X, in which X>1 (referred to collectively as user devices 150 and individually as user device 150).

The number of devices and the configuration in environment 100 are exemplary and provided for simplicity. According to other embodiments, environment 100 may include additional devices, fewer devices, different devices, and/or differently arranged devices, than those illustrated in FIG. 1. According to other embodiments, a single device in FIG. 1 may be implemented as multiple devices and/or multiple devices may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. Environment 100 may be implemented to include wired and/or wireless connections among the devices illustrated.

Network 105 includes one or multiple networks. For example, network 105 may be implemented as the Internet or another type of Internet Protocol (IP)-based network. Alternatively, network 105 may be implemented as a wide area network (WAN), an Intranet, a mobile network, a public network, a private network, etc.

Communication tracking system portal 110 includes network devices that provide communication tracking, recommendations, and other services as described herein. Communication tracking system portal 110 may be implemented as a computational device (e.g., a computer), a server (e.g., a Web server, an application server, etc.), a data management device and/or other suitable network device(s). Communication tracking system portal 110 may include a mass storage device to store user information pertaining to the services provided, as described herein.

User device 150 includes a mobile device and a portable device. For example, user device 150 may be implemented as a smartphone, a tablet device, a handheld device, a personal digital assistant (PDA), a palmtop device, a laptop computer, a desktop computer, a netbook, a gaming device, a telephone device (e.g., a VoIP telephone, a touch-tone phone, a cellphone, etc.), a television system (e.g., a television, a set top box, a video camera, and a remote control device), or a vehicular communication system (e.g., in a car, etc.).

User device 150 may include software (e.g., client software, etc.) to permit a user to communicate with other users/devices via e-mail, SMS, MMS, etc. Additionally, user device 150 may include one or multiple contact lists, address books, or the like, which are associated with one or more of the forms of communication described herein. According to an exemplary implementation, user device 150 may include software (e.g., client software) to communicate with communication tracking system portal 110. For example, a user may manage user preferences, turn on or turn off services provided by communication tracking system portal 110, etc. According to an exemplary implementation, a user may register user device 150 with communication tracking system portal 110. The registration process may include creating a user account, registering one or multiple user devices 150, and/or providing other information (e.g., contact list information, etc.).

Figure 2:
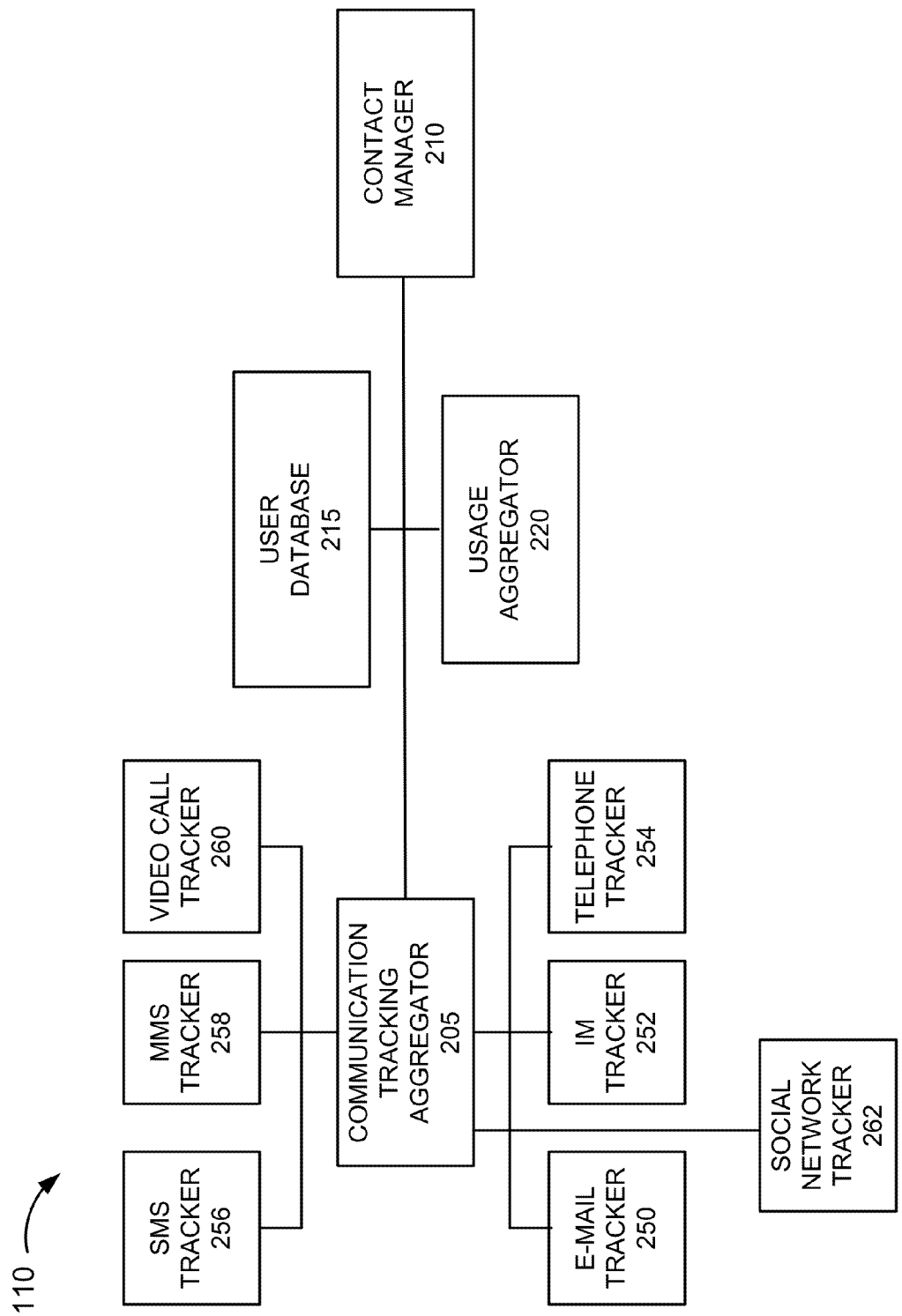
FIG. 2 is a diagram illustrating an exemplary embodiment of communication tracking system portal.

FIG. 2 is a diagram illustrating an exemplary embodiment of communication tracking system portal 110. As illustrated, communication tracking system portal 110 includes a communication tracking aggregator 205, a contact manager 210, a user database 215, and a usage aggregator 220. According to other embodiments, communication tracking system portal 110 may be implemented with additional, fewer, and/or different components than those illustrated in FIG. 2 and described herein.

Communication tracking aggregator 205 includes a network device that aggregates communication tracking information pertaining to a user's communications. According to an exemplary implementation, communication tracking aggregator 205 receives communication tracking information from an e-mail tracker 250, an IM tracker 252, a telephone tracker 254, an SMS tracker 256, an MMS tracker 258, and a video call tracker 260. According to other implementations, communication tracking aggregator 205 may receive communication tracking information from a communication tracker 262 directed to social networking sites (e.g., Facebook™, Twitter™, etc.) to obtain social network information (e.g., a social network tracker 262). The social network information may include sender, receiver, date, and time pertaining to posts, messages, etc. The user may provide communication tracking system portal 110 with the social network sites to which the user belongs, user login information, etc.

Communication tracking aggregator 205 stores communication tracking information in user database 215. As described further below, e-mail tracker 250, IM tracker 252, telephone tracker 254, SMS tracker 256, MMS tracker 258, and video call tracker 260 may obtain different types of communication tracking information given the inherent differences between these types of communication. For example, with reference to a telephone call, the communication tracking information may include the duration of the telephone call (e.g., start time and end time). In contrast and with reference to an e-mail communication, the communication tracking information includes a timestamp of when the e-mail is sent or received.

Contact manager 210 includes a network device that generates contact recommendations, automated communications, calculates communication gaps, and performs other functions or services, as described herein. According to an exemplary embodiment, contact manager 210 calculates communication gaps between a user and entities (or contacts). The calculated communication gaps may be displayed to the user via a user interface. For example, contact manager 210 may calculate a communication gap between the user and his/her best friend based only on telephone communications. According to another exemplary implementation, contact manager 210 may calculate the communication gap for each form of communication (e.g., e-mail, telephone, etc.). According to yet another implementation, contact manager 210 may calculate the communication gap in which all forms of communications are considered. For example, contact manager 210 may calculate a communication gap between the user and his/her friend based on e-mails and telephone calls between the user and his/her friend. According to an exemplary implementation, the extent of communication gaps calculated, etc., is based on user preferences. For example, the user may set user preferences pertaining to which type of communications communication gaps are calculated, for which contacts, etc.

According to an exemplary embodiment, contact manager 210 may permit the user to sort communication gaps based on duration (e.g., longest to shortest, shortest to longest, etc.). The user may sort communication gaps for a particular entity, selected entities, all entities (e.g., all contacts in the user's address book, etc.), based on different categories (e.g., family, friends, business, personal, etc.), based on time gaps (e.g., hours, days, months, etc.), and/or based on communication types. In this way, the user may be motivated to initiate a communication with one or more contacts based on communication gap information displayed.

According to an exemplary embodiment, contact manager 210 automatically generates a communication to a particular entity. For example, contact manager 210 may generate the communication when a communication gap exists (e.g., a user-configured length of time lapses) with respect to a contact. As an example, a user (e.g., a college student) tends to forget to call or text his parents due to his busy schedule. The user may set a user preference, via communication tracking system portal 110, to automatically generate a text message (e.g., an e-mail message, an SMS message) to be sent to his parents after 2 weeks, if no communication between the user and his parents has occurred.

According to an exemplary embodiment, contact manager 210 permits a user to selectively pick which forms of communication should be tracked, which contacts would be subject to tracking, set time periods pertaining to communication gaps, set auto-communication preferences, and/or manage other services provided by communication tracking system portal 110, as described herein. For example, the user may turn-on or turn-off, via communication tracking system portal 110, the tracking of communications relative to a particular contact, a group of contacts (e.g., friends, family, business, personal, etc.), etc.

According to an exemplary embodiment, contact manager 210 generates an alert to a user after a communication gap transpires. For example, if a user uses his/her user device (e.g., a smartphone) to pay his/her utility bill, when a communication gap goes beyond a particular time period (e.g., 25 days), contact manager 210 generates an alert to prompt the user to communicate with his/her utility company and/or pay a bill. According to an exemplary implementation, the user may set, via communication tracking system portal 110, to automatically pay his/her bill.

According to an exemplary embodiment, contact manager 210 generates contact recommendations based on calculated communication gaps and/or limit and usage information. As described further below, usage aggregator 220 analyzes a service limit (e.g., a maximum number of allowable mobile telephone minutes) and a current usage (e.g., a total number of mobile telephone minutes currently used by the user) and stores limit and usage information in user database 215. As an example, contact manager 210 may alert the user that the user has 20 allowable mobile telephone minutes to use within the next two days, and provide the user with a list of one or more contacts to call based on one or more communication gaps associated with the one or more contacts.

According to an exemplary embodiment, contact manager 210 may generate user interfaces that provide the user with communication gap information. According to an exemplary implementation, the user interface includes a solar system representation of communication gaps, in which the user is the center of the solar system and contacts are displayed as entities orbiting the user. The distance from the user to a contact represents a communication gap and/or an affinity level relative to the user. This exemplary user interface is described and depicted further below.

Figure 3:
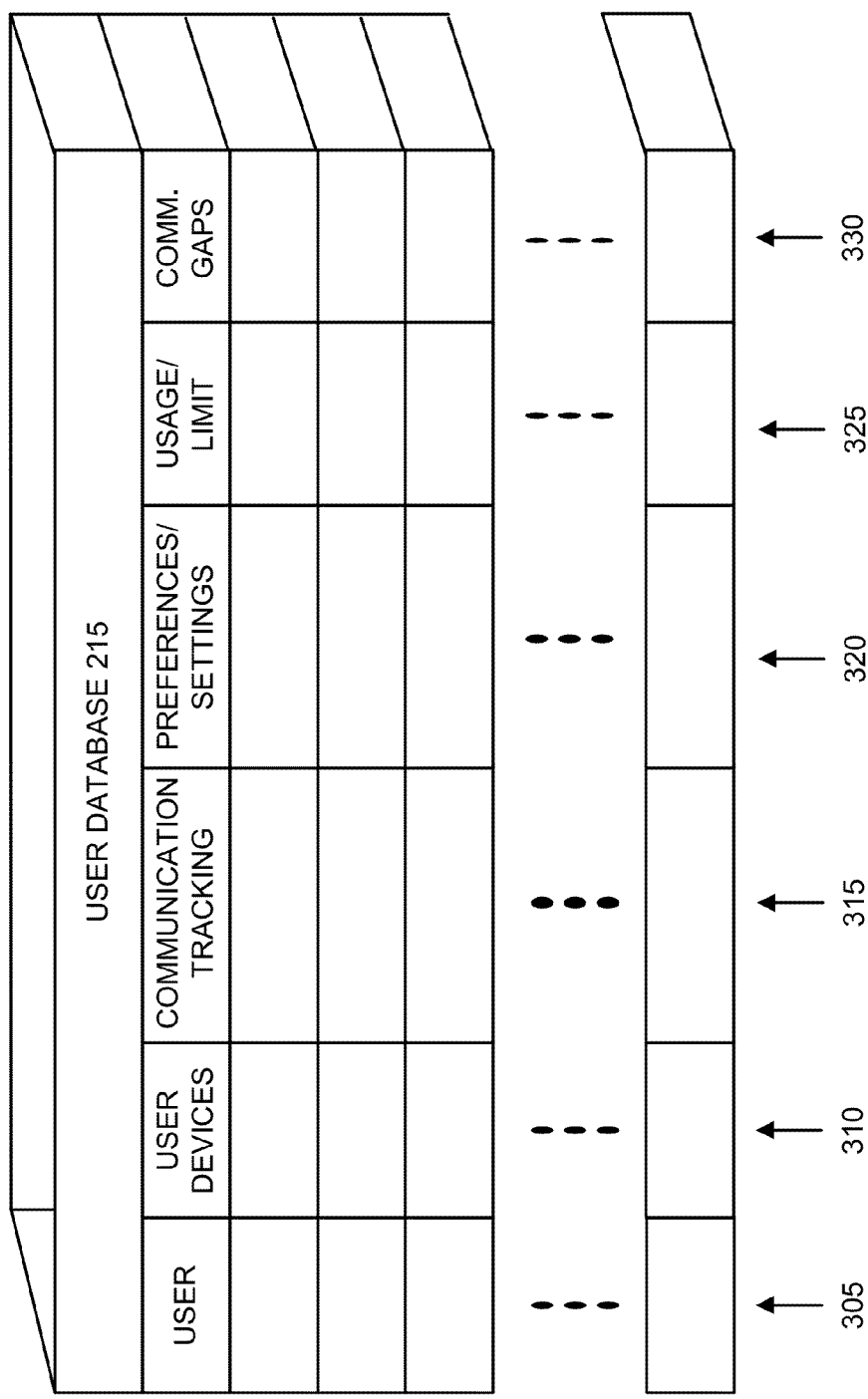
FIG. 3 is a diagram illustrating exemplary data and/or information stored by the user database depicted in FIG. 2.

User database 215 includes a database that stores communication tracking information, user preferences and settings pertaining to users, and other information that may be used by contact manager 210. FIG. 3 is a diagram illustrating exemplary data and/or information fields stored by user database 215. As illustrated, user database 215 includes a user field 305, a user devices field 310, a communication tracking field 315, a preferences/settings field 320, and a usage/limit field 325, and a communication gaps field 330. According to other implementations, user database 215 may include additional data/information fields, fewer data/information fields, or different data/information fields than those illustrated and described. Alternatively, according to other embodiments, a database may not be used. For example, information/data may be stored in some other manner.

User field 305 includes an identifier that indicates a user or a group of users. User devices field 310 includes information pertaining to user devices associated with the user(s). For example, the information may include the type of user device 150 (e.g., iPad 2® device, etc.), type of communications used by the user on a particular user device 150 (e.g., IM, SMS, telephone, etc.), and software used by the user (e.g., Google Talk™, Skype™, etc.). User devices field 310 may include an equipment identifier associated with user device 150. Communication tracking field 315 includes communication tracking information, as described herein. Preferences/settings field 320 includes user preferences and setting information. The user preferences and setting information may include one or more preferences and/or settings configured by a user via communication tracking portal 110. Preferences/settings field 320 may also store default preferences and/or settings. Usage/limit field 325 includes limit and usage information, as described herein. Communication gaps field 330 includes a time period that elapsed since a last communication (e.g., an e-mail, an SMS message, a telephone call, etc.) between a user and another entity.

Referring back to FIG. 2, usage aggregator 220 includes a network device that aggregates a user's usage of a particular service or form of communication. For example, with reference to mobile service, a user may have a limit on their account pertaining to the number of text messages that can be sent and received within a month before overage charges are applied. According to another example, a user may have a limit on their account pertaining to the number of peak minutes for telephone calls. According to an exemplary implementation, usage aggregator 220 receives usage limits associated with a user's account pertaining to various services (e.g., mobile service, Internet service, etc.), for example, from the user or the user's service provider, and the user's current usage (e.g., from a billing device associated with the service provider). Usage aggregator 220 provides limit and usage information to user database 215. Contact manager 210 may use the limit and usage information to generate contact recommendations, as described herein.

According to an exemplary embodiment, e-mail tracker 250, IM tracker 252, telephone tracker 254, SMS tracker 256, MMS tracker 258, and/or video call tracker 260 is/are implemented by user device 150. According to another exemplary embodiment, e-mail tracker 250, IM tracker 252, telephone tracker 254, SMS tracker 256, MMS tracker 258, and/or video call tracker 260 is/are implemented by one or multiple network devices.

The method of tracking e-mails, instant messages, telephone calls, SMS messages, MMS messages, and/or video calls may depend on various factors. For example, a service provider that provides Internet service, landline telephone service, television service, and mobile service to a user may have more options to track the user's communication than a third party service provider. Additionally, there are a variety of software (e.g., Google Talk™, Yahoo! Messenger™, Microsoft Outlook™, Skype™, browsers (e.g., Internet Explorer™, Mozilla Firefox™, etc.), etc.) that permits a user to communicate with others. Furthermore, communication tracking may be performed on the user device side, on the network side, or some combination, and involves various types of user devices 150, protocols, etc. User permission may be obtained and communication tracking information may be supplemented from the user. For example, the user may supplement communication tracking information via communication tracking system portal 110, as described herein.

Described below are exemplary methods that may be used to track communications of a user. This description is not intended to provide an exhaustive treatment of communication tracking. Accordingly, other methods (e.g., as are well known, etc.) for tracking communications, which have not been specifically described, may be implemented.

E-mail tracker 250 tracks e-mails destined to user device 150 and originating from user device 150. According to an exemplary embodiment, e-mail tracker 250 captures and stores e-mail information from e-mails including sender information (e.g., e-mail address of sender, name of sender, etc.), recipient information (e.g., e-mail address of recipient(s), name(s) of recipient(s), etc.), date, and time. E-mail tracker 250 may capture other types of e-mail information, such as, information in the subject line. According to an exemplary implementation, e-mail tracker 250 includes a keylogger that records keystrokes inputted via user device 150. For example, some e-mail services (e.g., Web-based e-mail or webmail, etc.) may encrypt e-mails, which prevent packet sniffing. According to another exemplary implementation, e-mail tracker 250 includes software having an application programming interface (API) with, for example, an e-mail client, to capture e-mail information. By way of example, e-mail information may be obtained via e-mails stored in an inbox folder and a sent mail folder. According to another implementation, e-mail tracker 250 includes a packet sniffer (also known as a packet analyzer). The packet sniffer may intercept traffic and capture data included in various fields of the packets.

The capturing and storing of communication tracking information pertaining to instant messages, short messaging service messages, and multimedia messaging service messages may be implemented in a manner similar to that described with respect to e-mails. IM tracker 252 tracks instant messaging messages destined to user device 150 and originating from user device 150. According to an exemplary embodiment, IM tracker 252 captures and stores instant messaging information including sender information (e.g., e-mail address, name of sender, etc.), recipient information (e.g., e-mail address, name of recipient, etc.), date, and time. SMS tracker 256 tracks short messaging service messages destined to user device 150 and originating from user device 150. According to an exemplary embodiment, SMS tracker 256 captures and stores short messaging service information including sender information (e.g., telephone number, name of sender), recipient information (e.g., telephone number, name of recipient, etc.), date, and time. MMS tracker 258 tracks multimedia messaging service messages destined to user device 150 and originating from user device 150. According to an exemplary embodiment, MMS tracker 258 captures and stores multimedia messaging service information including sender information (e.g., telephone number, name of sender), recipient information (e.g., telephone number, name of recipient, etc.), date, and time.

Telephone tracker 254 tracks telephone calls (e.g., mobile calls, landline calls, VoIP calls, etc.) destined to user device 150 and originating from user device 150. In cases when telephone calls are received via a landline telephone, the user may designate himself/herself as the recipient via communication tracking system portal 110. For example, in a household with multiple members, the caller may be a contact for one or more of the members in the household. According to other examples, when there is a single member in the household, this issue is rendered moot. Additionally, as described herein, communication tracking aggregator 205 may include an intelligence to ascertain telephone information associated with a landline telephone call based on other communication tracking information (e.g., e-mail information, etc.) and/or user/subscriber information, if available.

According to an exemplary embodiment, telephone tracker 254 captures and stores telephone information including sender information (e.g., a telephone number associated with the calling party), recipient information (e.g., a telephone number associated with the called party), date, time, and duration of the telephone call. Telephone information may include caller identification (ID) information, such as name of the calling party, calls associated with call waiting, three-way calling, etc. According to an exemplary embodiment, telephone tracker 254 is implemented by user device 150. For example, a mobile telephone or a VoIP telephone may include software that permits the capture and storing of telephone information. Alternatively, according to another exemplary embodiment, telephone tracker 254 is implemented by a network device. Depending on the type of voice network or telephone network used for a telephone call, telephone tracker 254 may be implemented by various network devices. According to an exemplary implementation, a voice network or a telephone network captures and stores telephone information for billing purposes. This information may be provided to communication tracking aggregator 205.

Video call tracker 260 tracks video calls (also known as video telephony) destined to user device 150 and originating from user device 150. According to an exemplary embodiment, video call tracker 260 captures and stores video call information including sender information (e.g., a telephone number associated with the calling party), recipient information (e.g., telephone number associated with the called party), date, time, and duration of the video call. Video call tracker 260 may be implemented in a manner similar to telephone tracker 254.

Although FIG. 2 illustrates an exemplary embodiment of communication tracking system portal 110, according to other embodiments, communication tracking system portal 110 may include additional devices, fewer devices, different devices, than those illustrated in FIG. 2 and described herein.

Figure 4:
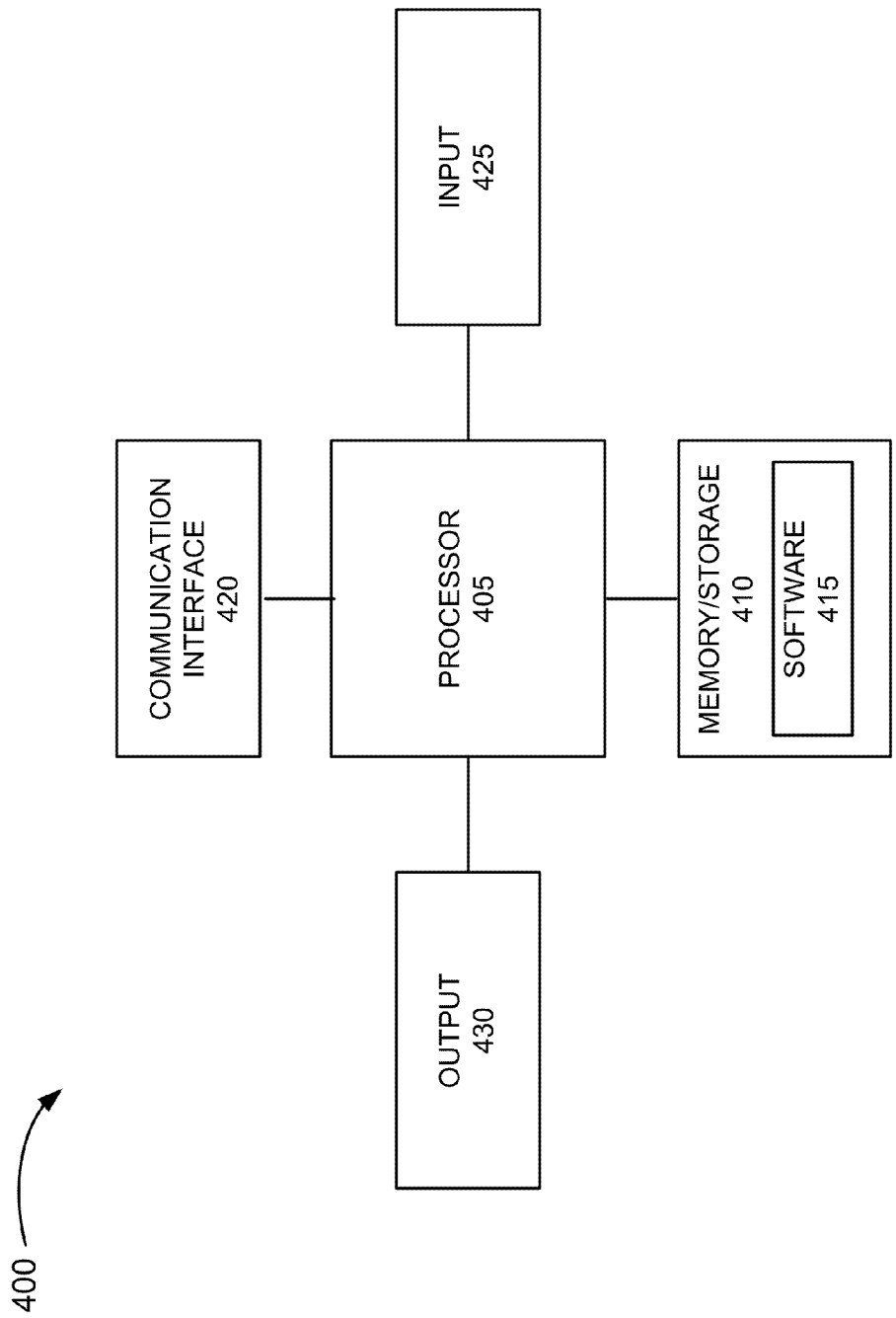
FIG. 4 is a diagram illustrating exemplary components of a device that may correspond to one or more of the devices in the environment depicted in FIGS. 1 and 2.

FIG. 4 is a diagram illustrating exemplary components of a device 400 that may correspond to one or more of the devices depicted in FIGS. 1 and 2. As illustrated, according to an exemplary embodiment, device 400 includes a processor 405, memory/storage 410 storing software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5A:
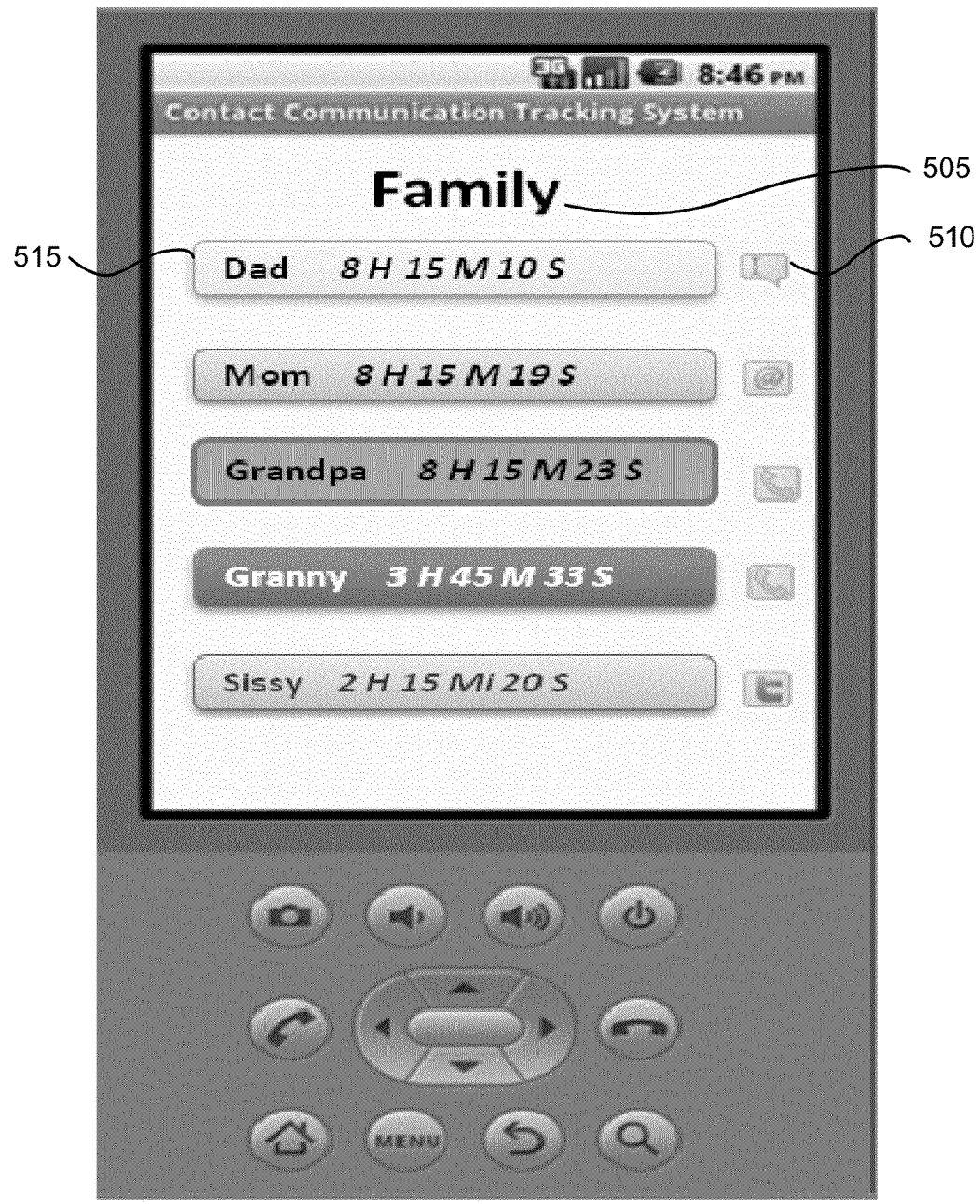
FIGS. 5A and 5B are diagrams illustrating exemplary user interfaces displayed by a user device pertaining to the communication tracking system portal.
Figure 5B:

FIGS. 5A and 5B are diagrams illustrating exemplary user interfaces displayed by user device 150 pertaining to communication tracking system portal 110. As illustrated in FIG. 5A, the user interface includes a graphical element 505 that indicates a category of contacts. In this example, graphical element 505 indicates a category of "family." According to other examples, graphical element 505 may indicate other categories (e.g., default categories or user-configured categories) from which the user may select. For example, the categories may include family, personal, business, etc. Additionally, the user interface includes a graphical element 510 that indicates a type of communication. In this example, graphical element 510 indicates instant messaging. According to other examples, graphical element 510 may indicate other forms of communication, such as e-mail, telephone, tweeting, SMS, MMS, video call, etc. As further illustrated, the user interface includes a graphical element 515 that indicates a contact and a communication gap. In this example, the contact is "Dad" and the communication gap is "8 h 15 m 10 s" indicating 8 hours, 15 minutes, and 10 seconds. According to this example, the user interface indicates a user setting for automatically generating an instant message to the user's father after a communication gap of 8 hours, 15 minutes, and 10 seconds transpires. The user may set automated communications via user device 150 and user interfaces. Graphical element 505 permits a user to sort automated communications based on selected categories.

Referring to FIG. 5B, the user interface includes graphical elements 510 and 515, which are similar in form to those of FIG. 5A. Additionally, the user interface includes a graphical element 520 that indicates time frames. In this example, the time frames include less than 48 hours, less than 1 week, and greater than 2 weeks. According to other examples, graphical element 520 may indicate other time frames (e.g., 1 day, 1 month, etc.), which may be default time frames and/or user configured time frames. According to this example, the user interface indicates a sorting of contacts in which their corresponding communication gaps are less than 48 hours. In this example, graphical element 515 indicates the user's father having a communication gap of 8 hours, 15 minutes, and 10 seconds. Graphical element 510 may indicate the last form of communication with this contact. In this example, the last form of communication between the user and the user's father was instant messaging.

Figure 6:
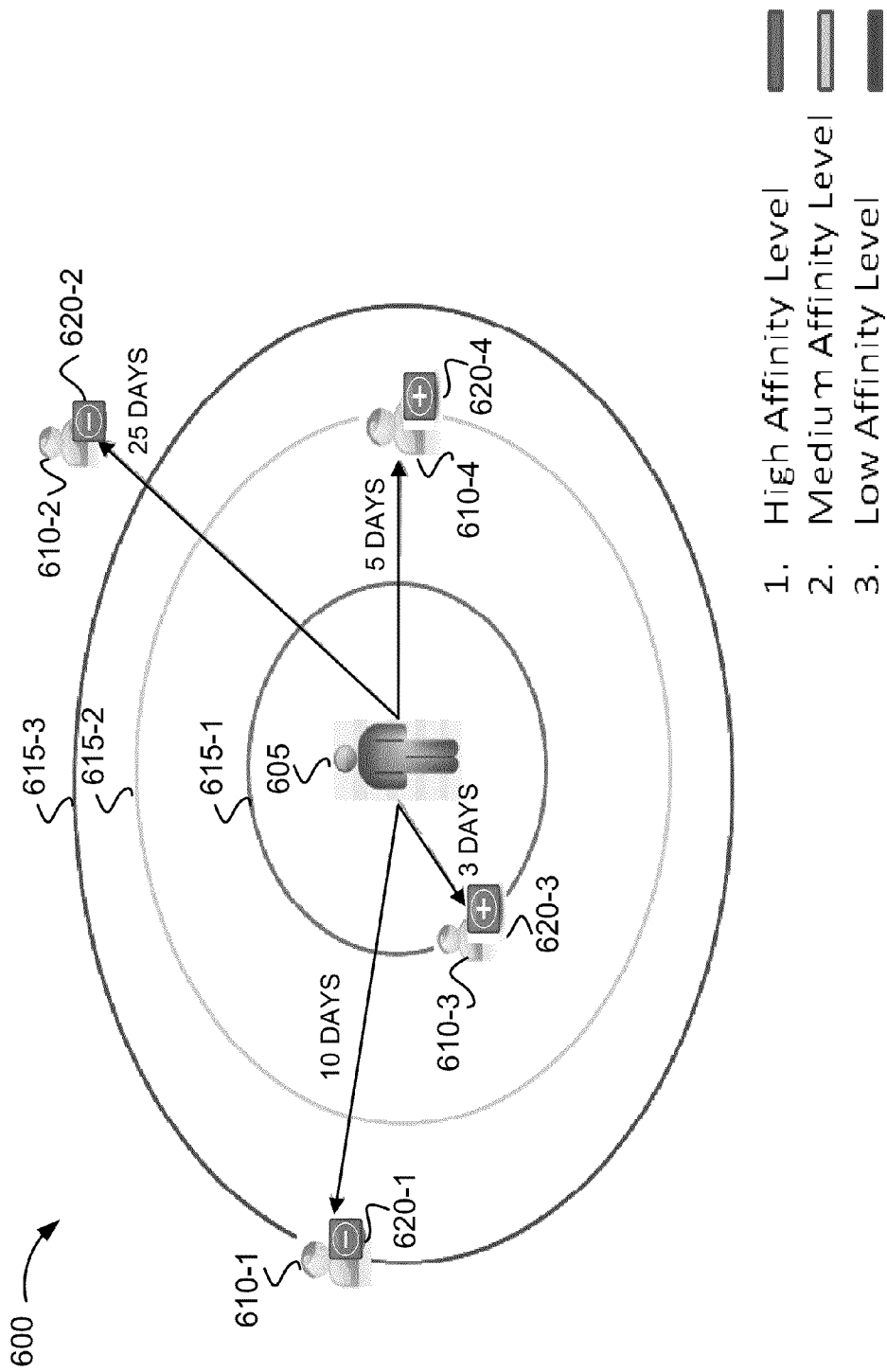
FIG. 6 is a diagram illustrating another exemplary user interface displayed by a user device pertaining to the communication tracking system portal.

FIG. 6 is a diagram illustrating another exemplary user interface displayed by a user device 150 pertaining to the communication tracking system portal 110. As previously described, according to an exemplary implementation, a user interface includes a solar system representation of communication gaps. As illustrated, a solar system 600 includes a graphical element 605 that indicates the user, graphical elements 610-1 through 610-4, which each indicate a contact, and graphical elements 615-1 through 615-3, which each indicate an orbit. In this example, orbit 615-1 represents a communication gap of 3 days, orbit 615-2 represents 5 days, and orbit 615-3 represents a communication gap of 10 days. According to other examples, distances from graphical element 605 or orbits may be mapped to periods of time other than days (e.g., hours, minutes, weeks, etc.).

In this example, the user interface includes graphical elements 620-1 through 620-4 that indicate whether automated communication is set or not. For example, for graphical element 610-2, graphical element 620-2 indicates that automated communication is turned off, but for graphical element 610-3, graphical element 620-3 indicates that automated communication is turned on.

According to an exemplary implementation, graphical elements 615 may indicate an affinity level. For example, graphical element 615-1 may indicate an orbit in which contacts in the orbit are considered high infinity level contacts, graphical element 615-2 may indicate an orbit in which contacts in the orbit are considered medium infinity level contacts, and graphical element 615-3 may indicate an orbit in which contacts in the orbit are considered low infinity level contacts.

According to an exemplary embodiment, communication tracking system portal 110 (e.g., contact manager 210) calculates affinity levels based on an active communication variable, a passive communication variable, a communication gap variable, and an allowed communication gap variable.

The active communication (AC) variable indicates that the user makes or receives an active form of a communication, such as a telephone call or a video call, with respect to a contact. The passive communication (PC) variable indicates that the user makes or receives a passive form of a communication, such as IM, SMS messaging, MMS messaging, e-mail, tweeting, etc., with respect to a contact. The communication gap (CG) variable indicates a total elapsed time (e.g., minutes, hours, days, months, years, etc.) since the last communication between the user and a contact. The allowed communication gap (ACG) variable indicates a maximum allowed elapsed time since the last communication between the user and a contact.

Based on the above variables, affinity levels may be calculated, such as, for example, a high affinity level (HAL), a medium affinity level (MAL), and a low affinity level (LAL). Provided below are exemplary equations using the variables described. An affinity level may be assigned to any contact.

$$(HAL): CG < X\% \, ACG \text{ or } PC < Y\% \, AC \qquad (1)$$

$$(MAL): CG < X\% \, ACG \text{ or } PC < Y\% \, AC \qquad (2)$$

$$(LAL): CG < X\% \, ACG \text{ or } PC > Y\% \, AC \qquad (3)$$

A (HAL) contact is a contact in which there is frequent communication with the user and the communication is mostly active communication (e.g., telephone calls, video calls). A (MAL) contact is a contact in which active communication is more often used than passive communication. A (LAL) contact is a contact in which passive communication is preferred and active communication is rarely used. In equations (1)-(3), the variable X and Y may be assigned any numeric value that reflects the affinity level. For example, for a (HAL), the variable X may be a small number (e.g., 5-15) or other suitable value. In such a case, a small percentage of the (ACG) is greater than the (CG). Additionally, for example, for a (HAL), the variable Y may be a small number (e.g., 5-15) or other suitable value. In such a case, a small percentage of the number of active communications is greater than the number of passive communications. The variables X and Y may be predefined or user-configurable.

According to an exemplary embodiment, the affinity level of a contact may be applied to the user interface depicted in FIG. 6. For example, contacts orbiting within graphical element 615-1 (orbit 615-1) may be of a high affinity level with respect to the user. Similarly, contacts orbiting within graphical element 615-2 (orbit 615-2) may be of a medium affinity level, and contacts orbiting within graphical element 615-3 (orbit 615-3) may be of a low affinity level. The calculated affinity levels may be applied to other processes, such as generating contact recommendations.

Described below are exemplary processes pertaining to some of the processes described herein. According to exemplary embodiments, these processes may be performed by communication tracking system portal 110 and/or user device 150. According to an exemplary implementation, these processes may be performed by processor 405 executing software 415.

Figure 7:
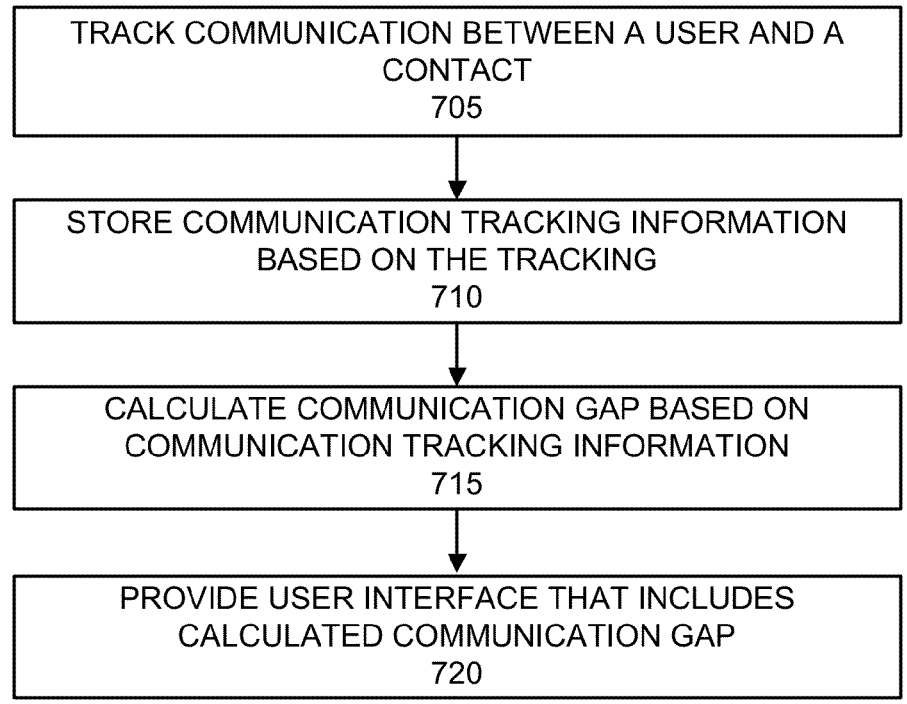
FIG. 7 is a flow diagram illustrating an exemplary process 700 for providing communication gap information to a user.

FIG. 7 is a flow diagram illustrating an exemplary process 700 for providing communication gap information to a user. According to an exemplary implementation, it may be assumed that the user has stored a preference or has indicated to track communications with the contact. As previously described, the user may indicate whether to track all forms of communications or select forms of communication (e.g., only e-mail, etc.). Process 700 may begin with tracking communications between a user and a contact (block 705). For example, e-mail tracker 250, IM tracker 252, telephone tracker 254, SMS tracker 256, MMS tracker 258, and/or video call tracker 260 tracks communications between the user and the contact. Additionally, as previously described, other forms of tracking may be performed (e.g., social network tracking).

In block 710, communication tracking information is stored based on the tracking. For example, communication tracking aggregator 205 aggregates the communication tracking information and stores the communication tracking information. By way of example, the communication tracking information may be stored by user database 215.

In block 715, a communication gap is calculated based on the communication tracking information. Contact manager 210 calculates a communication gap pertaining to the user and the contact. As previously described, contact manager 210 may calculate one or multiple communication gaps depending on, for example, the user's preference. By way of example, contact manager 210 may calculate a communication gap for each form of communication. For example, assume contact manager 210 calculates a communication gap in view of e-mails, SMS messages, and telephone calls. Contact manager 210 calculates a communication gap for e-mails, a communication gap for SMS messages, and a communication gap for telephone calls.

Alternatively, contact manager 210 may calculate a communication gap based on all communications collectively. For example, assume the communication gap for e-mails is 20 days, the communication gap for SMS messages is 18 days, and the communication gap for telephone calls is 7 days. According to this example, contact manager 210 would determine that the communication gap between the user and the contact is 7 days.

In block 720, a user interface is provided that includes the calculated communication gap. For example, communication tracking system portal 110 and/or user device 150 provide a user interface that indicates a communication gap. According to an exemplary implementation, the user interface may include a solar system, as illustrated in FIG. 6. According to an exemplary implementation, the user interface may indicate the communication gap numerically (e.g., in hours, minutes, days, etc.). According to an exemplary implementation, the user interface may categorize the contact (e.g., as a family member, friend, etc.). According to an exemplary implementation, the user interface may sort the communication gap based on a time period (e.g., less than 48 hours, etc.), the type of communication (e-mail, SMS message, etc.), the affinity level of the contact, and/or communication category (e.g., passive communication, active communication).

Although FIG. 7 illustrates an exemplary process 700 for providing communication gap information, according to other embodiments, process 700 may include additional operations, fewer operations, and/or different operations than those illustrated in FIG. 7.

Figure 8:
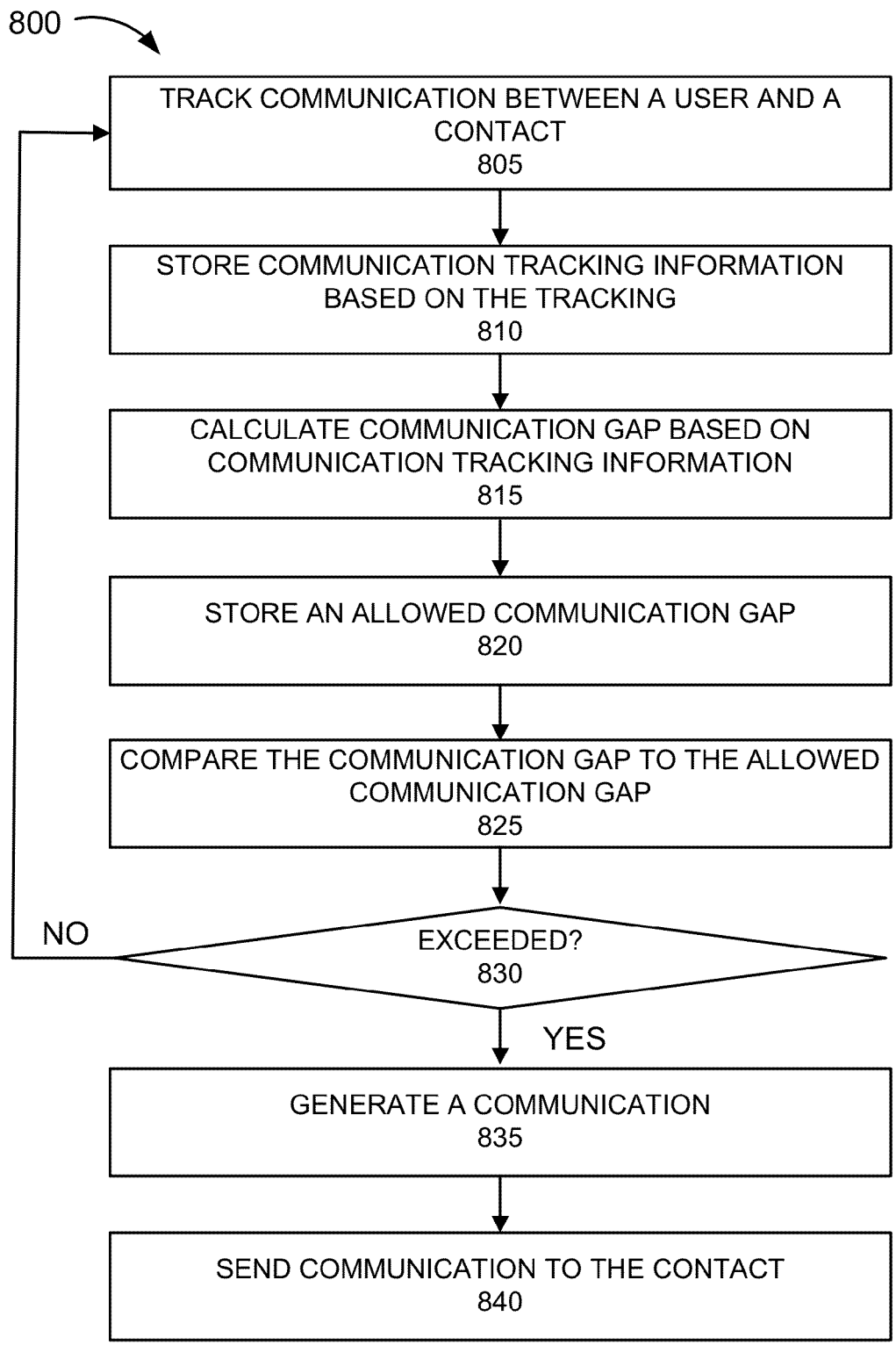
FIG. 8 is a flow diagram illustrating an exemplary process for generating automated communications based on communication gap information.

FIG. 8 is a flow diagram illustrating an exemplary process 800 for generating automated communications based on communication gap information.

Blocks 805-815 may performed in a manner similar to that previously described in process 700 for blocks 705-715.

In block 820, an allowed communication gap is stored. For example, communication tracking system portal 110 (e.g., user database 215) may store the allowed communication gap. The allowed communication gap specifies a time period in which a lapse of communication between the user and a contact is permitted. According to an exemplary implementation, the allowed communication gap may pertain to all communications. According to another exemplary implementation, the allowed communication gap may pertain to a specific form of communication.

In block 825, the calculated communication gap is compared to the allowed communication gap. For example, communication tracking system portal 110 (e.g., contact manager 210) compares the numerical values representative of a time period associated with the communication gap and the numerical values representative of a time period associated with the allowed communication gap are compared. As previously described, the time period may be expressed in terms of seconds, minutes, hours, days, weeks, months, etc.

In block 830, it is determined whether the calculated communication gap exceeds the allowed communication gap based on the comparison. If it is determined that the calculated communication gap does not exceed the allowed communication gap (block 830-NO), then process continues to block 805. If it is determined that the calculated communication gap exceeds the allowed communication gap (block 830-YES), then a communication is generated (block 835).

According to an exemplary implementation, the type of communication generated is based on a user preference. For example, the user may wish to have an SMS message generated. Alternatively, the user may wish to have an MMS message, an e-mail message, or even a telephone call generated.

According to an exemplary implementation, the user may also set preferences pertaining to the content of the communication. For example, assume the user selected a telephone call as the type of communication. The user may record a voice message to be used for the automated telephone call. According to other examples, the user may store a message to be used for the automated e-mail, SMS message, etc.

In block 840, the communication is sent to the contact. For example, communication tracking system portal 110 sends the communication to the contact.

Although FIG. 8 illustrates an exemplary process 800 for generating automated communications, according to other embodiments, process 800 may include additional operations, fewer operations, and/or different operations than those illustrated in FIG. 8. For example, according to other embodiments, in response to determining that the communication gap exceeds the allowed communication gap, an alert is generated and provided to the user. The alert may indicate that, for this contact, the current communication gap exceeds the allowed communication gap. The alert may also include a prompt to the user requesting whether he/she would like to initiate a communication now. According to an exemplary implementation, the alert may be displayed to the user via user device 150. Alternatively, the alert may be transmitted to the user via a communication (e.g., an e-mail, an SMS message, a voice message, etc.). Additionally, for example, when the contact is a utility company or other institution (e.g., a bank, a credit card company, etc.), process 800 may include making a payment. The user may set preferences (e.g., amount of payment, etc.) and other information (e.g., user login information for user's bank, etc.) to permit such a transaction.

According to another exemplary implementation, process 800 may include considering usage limits. For example, suppose the user has 10 minutes left to use within the next two days. Communication tracking system portal 110 may not generate and place a telephone call to the contact because there are so few minutes available minutes left. According to an exemplary implementation, communication tracking system portal 110 may make this decision based on a user preference (e.g., a block-out time period for automated communications). Additionally, or alternatively, under such circumstances, communication tracking system portal system 110 may generate and send the communication provided the contact is of a particular affinity level (e.g., a high affinity level).

Figure 9:
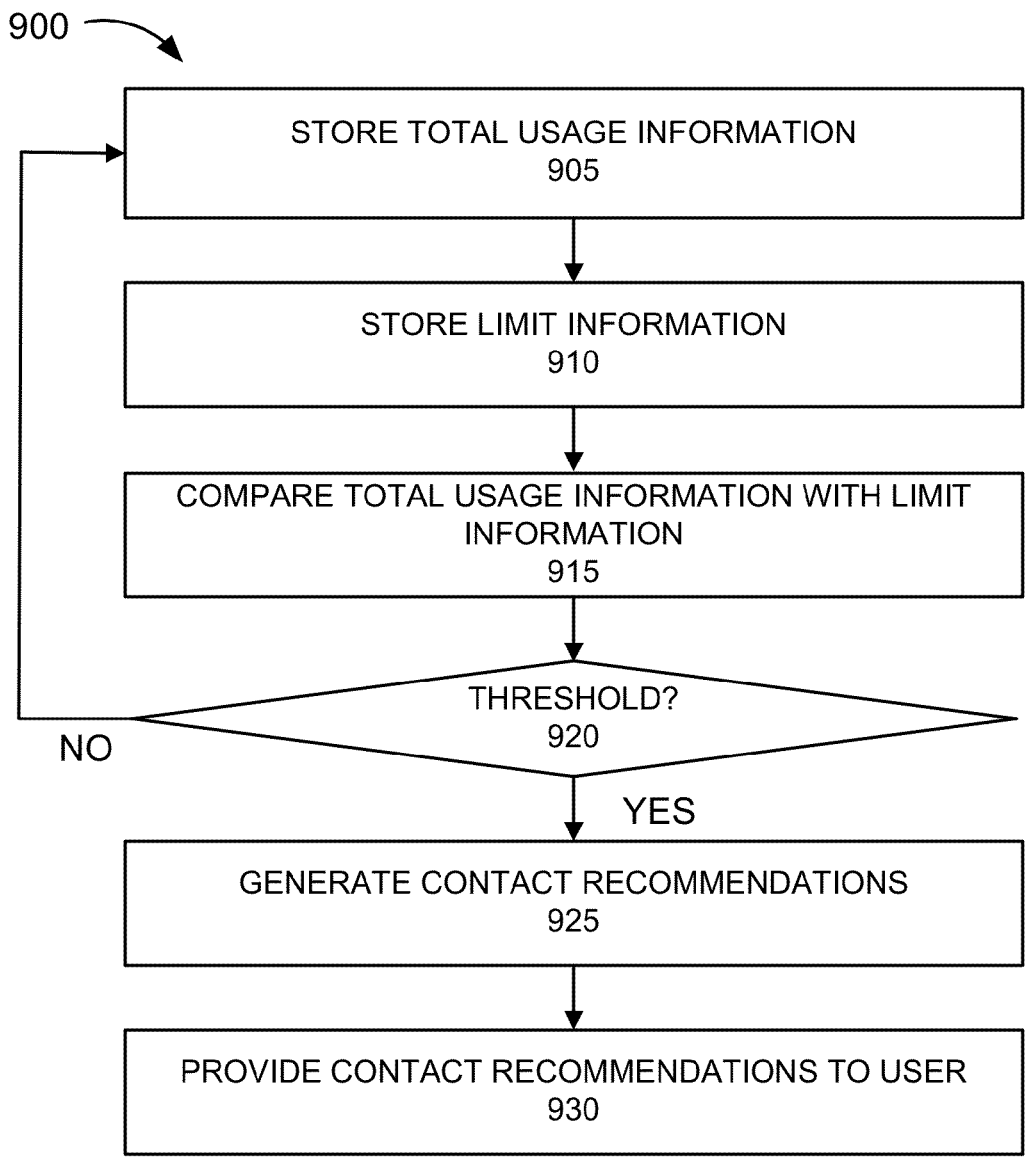
FIG. 9 is a flow diagram illustrating an exemplary process for generating contact recommendations based on communication tracking information.

FIG. 9 is a flow diagram illustrating an exemplary process 900 for generating contact recommendations based on communication tracking information.

Process 900 may begin with storing total usage information (block 905). For example, communication tracking system portal 110 (e.g., usage aggregator 220) stores total usage information associated with a user (e.g., in database 215). For example, based on communication tracking information pertaining to a user, usage aggregator 220 determines that the user has used 700 mobile telephone minutes by way of either receiving telephone calls or placing telephone calls via user device 150 (e.g., the user's mobile phone).

In block 910, limit information is stored. For example, communication tracking system portal 110 (e.g., usage aggregator 220) stores limit information that pertains to one or more types of communication (e.g., in database 215). In continuation of the example described for block 905, the limit information pertains to the user's limit of mobile telephone minutes. For example, the user's mobile telephone limit is 750 minutes.

In block 915, total usage information is compared with limit information. For example, communication tracking system portal 110 (e.g., contact manager 210) compares the total usage limit information with the limit information. For example, the total usage information includes a numeric value of 700 minutes and the limit information includes a numeric value of 750 minutes. Contact manager 210 may calculate a difference between the used minutes and allowable minutes. According to this example, the difference equates to 50 minutes.

In block 920, it is determined whether a threshold for generating recommendations is met. Contact manager 210 identifies a user preference pertaining to generating contact recommendations. According to an exemplary implementation, the user preference includes a threshold value, that if satisfied, permits contact manager 210 to generate recommendations. According to this example, assume the threshold value is 50 minutes or less.

If it is determined that the threshold is not met (block 920-NO), process 900 continues to block 905. If it is determined that the threshold is met (block 920-YES), then a contact recommendation is generated (block 925). According to an exemplary implementation, contact manager 210 selects one or more contacts to recommend to the user with which to communicate based on communication gap information. For example, contact manager 210 may select a contact associated with the largest communication gap. Additionally, or alternatively, contact manager 210 may select a contact that the user typically communicates via mobile telephone. According to another implementation, contact manager 210 may consider other factors, such as affinity level, total number of mobile telephone calls and/or total number of mobile minutes used for a contact, etc.

In block 930, the contact recommendation is provided to the user. For example, contact manager 210 displays or makes available to the user one or more contact recommendations.

Although FIG. 9 illustrates an exemplary process 900 for generating contact recommendations, according to other embodiments, process 900 may include additional operations, fewer operations, and/or different operations than those illustrated in FIG. 9. For example, according to another exemplary embodiment, process 900 may include generating an alert to inform the user that the threshold has been met and/or indicate a balance of minutes, etc., left before overage charges may apply. The user may then have the option to request contact recommendations.

The foregoing description of embodiments provides illustration, but is not intended to be exhaustive or to limit the embodiments to the precise form disclosed. Accordingly, modifications to the embodiments described herein may be possible. For example, according to an exemplary embodiment, any service described herein may be provided based on a communication gap, an allowed communication gap, affinity level, type of communication, category of contact, and/or usage/limit information.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 7-9, the order of the blocks may be modified according to other embodiments.

Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   storing a user preference pertaining to tracking communications;
   tracking communications between a user and another party based on the stored user preference;
   obtaining, by a device, communication tracking information based on the tracking;
   calculating a communication gap based on the communication tracking information, wherein the communication gap is a period of time that elapsed from a last communication with the other party to a current time; and
   providing communication gap information to the user.

2. The method of claim 1, wherein the communications includes one or more types of communications including at least one of a telephone call, an e-mail, an Instant message, a Short Messaging Service message, or a Multimedia Messaging Service message.

3. The method of claim 2, wherein the calculating comprises:
   calculating a communication gap for each type of communication.

4. The method of claim 1, further comprising:
   storing a user preference indicating an allowed communication gap;
   comparing the allowed communication gap with the communication gap;
   determining whether the communication gap exceeds the allowed communication gap;
   generating at least one of an alert for the user or an automated communication to be sent to the other party in response to determining that the communication gap exceeds the allowed communication gap; and
   providing the alert to the user or the automated communication to the other party.

5. The method of claim 4, further comprising:
   determining whether the other party is of a particular affinity level relative to the user; and
   omitting to generate the automated communication in response to determining that the other party is not of the particular affinity level.

6. The method of claim 5, further comprising:
   calculating an affinity level for the other party based on active and passive communication categories; and
   assigning the affinity level to the other party.

7. The method of claim 6, further comprising:
   generating a user interface that includes a graphical representation of a solar system, wherein the user is a center of the solar system and other parties including the other party are associated with one or more orbits around the center, and wherein a distance of the other parties from the center is based on their respective affinity levels.

8. The method of claim 1, further comprising:
   calculating total usage information pertaining to the communications, wherein the total usage information includes a numeric value representing an amount of use, by the user, pertaining to one or more types of communications;
   storing limit information pertaining to the communications, wherein the limit information includes a numeric value representing a limit to a use, by the user, pertaining to the one or more types of communications;
   comparing the total usage information to the limit information; and
   generating contact recommendations based on the comparing.

9. A system comprising:
   one or more memories that store instructions; and
   one or more processors to execute the instructions to:
   track communications between a user and a user-selected party;
   obtain communication tracking information based on the tracking, wherein the communication tracking information includes a time associated with each communication;
   calculate a communication gap pertaining to the user-selected party based on the communication tracking information, wherein the communication gap is a period of time that elapsed from a last communication with the other party to a current time; and
   provide the user with communication gap information in response to receiving a user request.

10. The system of claim 9, wherein the communications includes one or more types of communications including at least one of a telephone call, an e-mail, an Instant message, a Short Messaging Service message, or a Multimedia Messaging Service message.

11. The system of claim 9, wherein the one or more processors further execute the instructions to:
   store an allowed communication gap pertaining to the user-selected party;
   compare the allowed communication gap to the communication gap;

determine whether the communication gap exceeds the allowed communication gap;

generate at least one of an alert for the user or an automated communication to be sent to the user-selected party in response to a determination that the communication gap exceeds the allowed communication gap; and provide the alert to the user or the automated communication to the user-selected party.

12. The system of claim 9, wherein the one or more processors further execute the instructions to:

calculate an affinity level of the user-selected party relative to the user based on the allowed communication gap; and assign the affinity level to the user-selected party.

13. The system of claim 12, wherein the one or more processors further execute the instructions to:

provide a user interface that includes a graphical representation of a solar system, wherein the user is a center of the solar system and other parties including the user-selected party are associated with one or more orbits around the center, and wherein a distance of the other parties from the center is based on their respective affinity levels.

14. The system of claim 9, wherein the one or more processors further execute the instructions to:

calculate total usage information pertaining to the communications, wherein the total usage information includes a numeric value representing an amount of use, by the user, pertaining to one or more types of communications;

compare the total usage information to limit information, wherein the limit information includes a numeric value representing a limit to a use, by the user, pertaining to the one or more types of communications;

determine, in response to a comparison, whether a difference between the numeric value of the total usage information and the numeric value of the limit information satisfies a threshold value; and generate one or more recommendations for the user to contact, in response to a determination that the difference satisfies the threshold value.

15. The system of claim 9, wherein the one or more processors further execute the instructions to:

sort the communication gap information according to one or more time periods; and provide the sorted communication gap information in response to receiving a user request.

16. A non-transitory storage medium storing instructions executable by a computational device to:

track communications between a user and a user-selected party;

obtain communication tracking information based on the tracking, wherein the communication tracking information includes a time associated with each communication;

calculate a communication gap pertaining to the user-selected party based on the communication tracking information, wherein the communication gap is a period of time that elapsed from a last communication with the other party to a current time; and provide the user with communication gap information in response to receiving a user request.

17. The non-transitory storage medium of claim 16, further storing instructions executable by the computational device to:

store an allowed communication gap pertaining to the user-selected party;

compare the allowed communication gap to the communication gap;

determine whether the communication gap exceeds the allowed communication gap;

generate at least one of an alert for the user or an automated communication to be sent to the user-selected party in response to a determination that the communication gap exceeds the allowed communication gap; and provide the alert to the user or the automated communication to the user-selected party.

18. The non-transitory storage medium of claim 16, further storing instructions executable by the computational device to:

calculate an affinity level of the user-selected party relative to the user based on a type and a frequency of communications between the user and the user-selected party; and assign the affinity level to the user-selected party.

19. The non-transitory storage medium of claim 16, further storing instructions executable by the computational device to:

sort the communication gap information according to at least one of a time period or category pertaining to the user-selected party; and provide the sorted communication gap information in response to receiving a user request.

20. The non-transitory storage medium of claim 16, further storing instructions executable by the computational device to:

store user preferences pertaining to a tracking of the communications.

21. A user device comprising:

a communication interface;

one or more memories that store instructions; and one or more processors to execute the instructions and configure the one or more processors to:

track communications between a user and a user-selected party based on one or more user preferences;

obtain communication tracking information based on the tracking, wherein the communication tracking information includes a time associated with each communication;

calculate a communication gap pertaining to the user-selected party based on the communication tracking information, wherein the communication gap is a period of time that elapsed from a last communication with the other party to a current time; and provide the user with communication gap information in response to receiving a user request.

22. The user device of claim 21, wherein the one or more processors further execute the instructions to:

store an allowed communication gap pertaining to the user-selected party;

compare the allowed communication gap to the communication gap;

determine whether the communication gap exceeds the allowed communication gap;

generate at least one of an alert for the user or an automated communication to be sent to the user-selected party in response to a determination that the communication gap exceeds the allowed communication gap; and provide the alert to the user or the automated communication to the user-selected party.

23. The user device of claim 21, wherein the one or more processors further execute the instructions to:

display the communication gap information to the user based on a graphical representation of a solar system.

24. The user device of claim 21, wherein the one or more processors further execute the instructions to:
- sort the communication gap information according to at least one of a time period or category pertaining to the user-selected party; and
- provide the sorted communication gap information in response to receiving a user request.

25. The user device of claim 21, wherein the user device is a mobile device.

\* \* \* \* \*